April 23, 1963 K. E. BENTLEY ETAL 3,086,924
OXYGEN DETECTION
Filed May 18, 1959 2 Sheets-Sheet 1

INVENTOR.
KENTON EARL BENTLEY
LELAND GORDON COLE
BY
Christie, Parker & Hale
ATTORNEYS.

INVENTOR.
KENTON EARL BENTLEY
BY LELAND GORDON COLE

ATTORNEYS

United States Patent Office 3,086,924
Patented Apr. 23, 1963

3,086,924
OXYGEN DETECTION
Kenton Earl Bentley, Albuquerque, N. Mex., and Leland Gordon Cole, Arcadia, Calif., assignors, by mesne assignments, to Consolidated Electrodynamics Corporation, Pasadena, Calif., a corporation of California
Filed May 18, 1959, Ser. No. 813,960
6 Claims. (Cl. 204—1)

This invention relates to detecting the presence of oxygen bound either physically or chemically in a sample.

Briefly, the invention contemplates the detection of oxygen bound in a sample in a first state by releasing the oxygen from the first state, combining the released oxygen with hydrogen to form water, and thereafter detecting the formed water, preferably by subjecting it to electrolytic decomposition.

For example, if the presence of dissolved oxygen in a liquid sample, say boiler feed water, is to be detected, a sample of the water is treated with an ejector scrubber to remove the dissolved oxygen, which is then dried, and reacted with hydrogen to form the water, which is thereafter subjected to electrolytic decomposition.

To make a quantitative analysis, the amount of current required to effect the decomposition of the water is measured.

The invention is applicable to many processes. For example, it is useful in determining dissolved oxygen in liquids, such as boiler feed water, industrial wastes, chemical process streams, etc., or in making indirect determinations of substances that can be treated to cause them to take up or yield a definite number of equivalents of oxygen.

These and other aspects of the invention will be more fully understood from the following detailed description taken in conjunction with the accompanying drawings in which.

Figure 1:
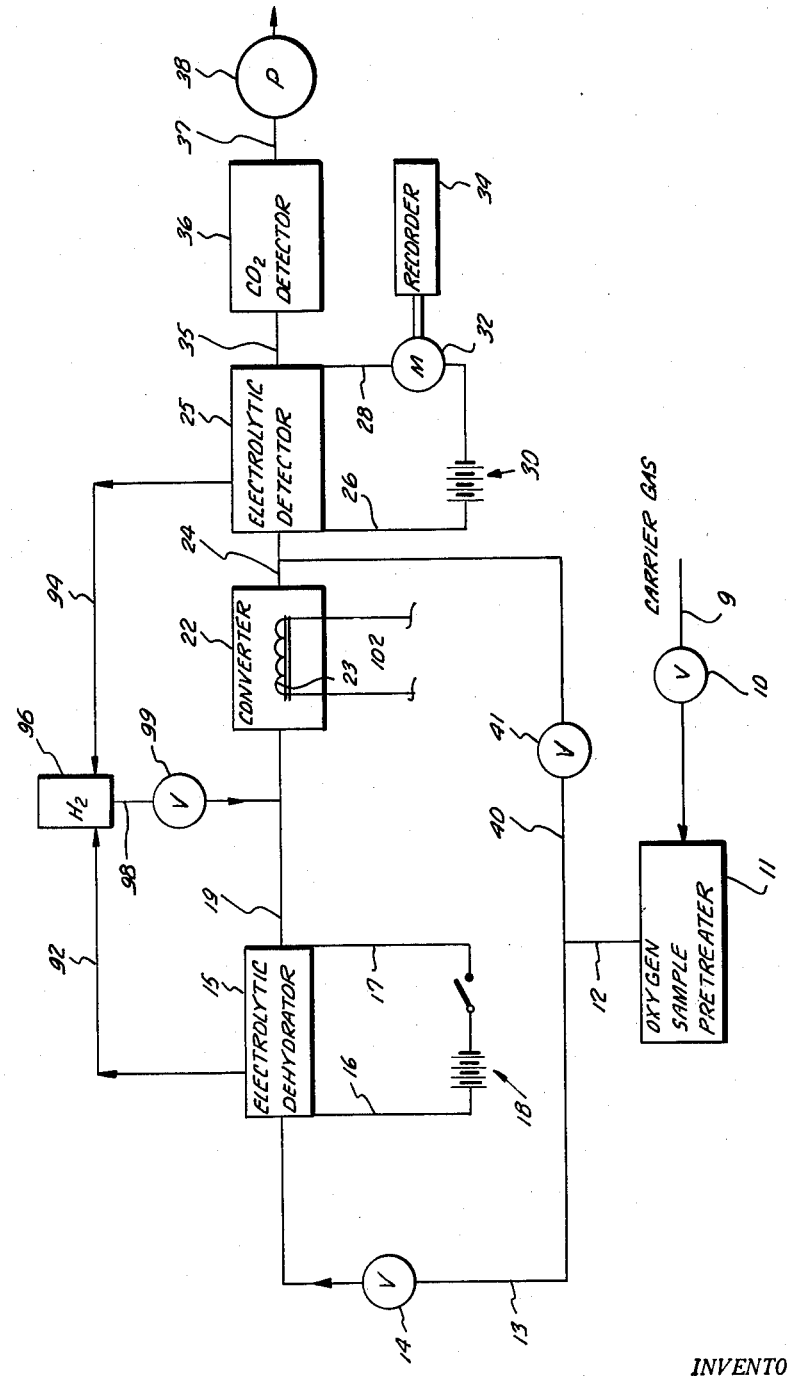
FIG. 1 is a schematic flow diagram showing the assembly of various equipment required to practice the invention.

Referring to FIG. 1, a carrier gas, such as helium or hydrogen, flows through a carrier gas line 9, a carrier gas control valve 10, an oxygen sample pretreator 11, a main line 12, a first branch line 13, a first bypass valve 14, and into an electrolytic dehydrator 15, which is the subject matter of copending application Serial No. 676,117, filed August 5, 1957, now abandoned, and which is described in detail below in conjunction with FIGS. 2 and 3. An anode 16 and a cathode 17 of the electrolytic dehydrator are connected to the positive and negative terminals, respectively, of a source of D.C. electric power 18.

The outlet of the electrolytic dehydrator is connected by a flow line 19 to the inlet of a converter chamber 22 which includes a heated electric coil 23 supplied power from a suitable source (not shown). The outlet of the converter is connected by a flow line 24 to the inlet of an electrolytic detector 25 which has an anode 26 and a cathode 28 connected to the positive and negative terminals, respectively, of a source of D.C. power 30. The detector 25 may be the same type of device described below with respect to FIGS. 2 and 3. An electric meter 32 and recorder 34 are connected in the circuit of the electrolytic detector to measure and record the amount of current flowing through the detector. The outlet of the electrolytic detector is connected by a flow line 35 to the inlet of a carbon dioxide detector 36, which has its outlet connected by a flow line 37 to the inlet of a vacuum pump 38.

In those cases where drying of the fluid stream and reaction in the converter is not required, fluid flow from the oxygen sample pretreator can be supplied from main line 12 through a bypass line 40 and valve 41 directly to the inlet of the electrolytic detector 25. In this case, valve 14 in the branch line 13 is closed.

Figure 2:
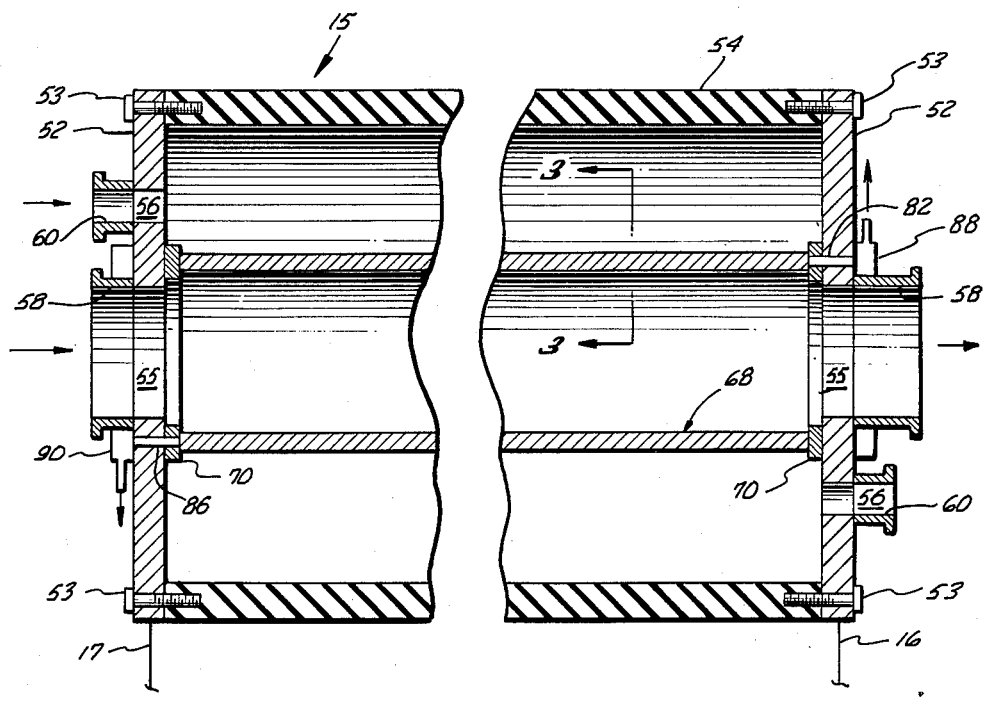
FIG. 2 is a schematic sectional elevation of one form of an electrolytic moisture detector used in the invention.

Referring to FIG. 2, which shows the electrolytic dehydrator in detail, a pair of circular metal end plates 52 are secured by screws 53 over the opposite ends of a tubular outer housing 54 made of a suitable insulating material such as plastic. Each end plate includes a central opening 55 and a side opening 56 extending through it. A separate flange connection 58 around each central opening is adapted to be connected to flow lines to let fluid pass through the housing interior. Similar flange connections 60 are disposed around the side outlets in the plates.

The right side (as viewed in FIG. 2) plate is connected through the lead 16 to the positive side of the D.C. source 18, and is hereinafter referred to as the anode end plate. The other end plate is connected through a lead 17 to the negative terminal of the D.C. source, and is hereinafter referred to as the cathode plate. A tubular sorption matrix 68 is coaxially disposed in the housing and sealed at each end against the end plates by a separate annular electrically insulating gasket 70 around each central opening in the end plates.

Figure 3:
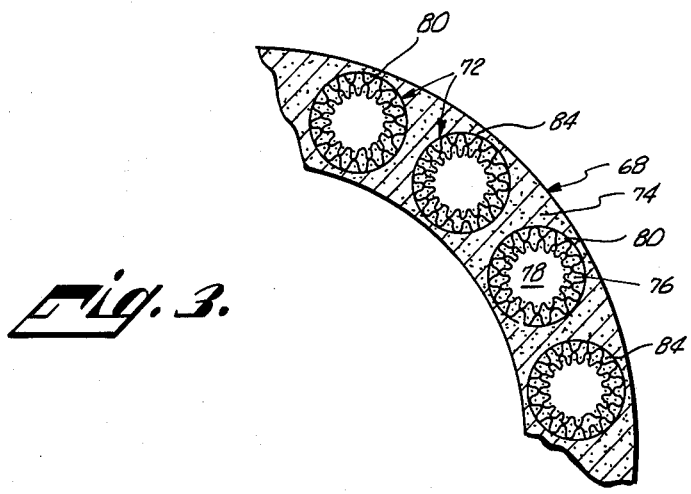
FIG. 3 is a view taken on line 3—3 of FIG. 2.

As shown most clearly in FIG. 3, the sorption matrix includes a plurality of elongated longitudinal tubes 72 spaced from each other and bridged and held together by a suitable sorption medium 74 such as dehydrated phosphoric acid. Each electrode is formed from a roll of screen 76 so that each electrode has a longitudinal passageway 78, and also has lateral permeability due to the porosity of the screen. The hollow and porous electrodes can be formed in a variety of ways and from many different materials. A suitable electrode is made by rolling a section of screen of about 300 mesh to form a tube having an outside diameter of 3/16" and an inside diameter of 1/32". After rolling, the screen is heated to cause the screen to fuse, but not close the screen openings. The electrodes can be of any suitable materials which are inert to the sorption medium and the electrolytic decomposition products. For example, in removing water with anhydrous phosphoric acid, the anodes are made of platinum, and the cathodes are made of stainless steel. The spacing between, and voltage across, adjacent anodes and cathodes can vary widely, but a spacing of 1 mil and voltage of 30 volts provides satisfactory operation at about 30° C. and near atmospheric pressure.

The sorption matrix may be prepared in different ways. One suitable way is to support the electrodes in a suitable holder (not shown) in the configuration shown in FIG. 2, and then coat the exterior of the electrodes with phosphoric acid, applying a suitable number of layers with drying between each application to build up a sorption medium as shown in FIG. 3. Thus, a tubular sorption matrix is formed which is coated on both its interior and exterior with the sorption medium. The sorption matrix is electrically conductive when wet and nonconductive when dry. The sorption matrix can also be built up on the electrodes by vapor deposition, spraying, etc. Other hygroscopic materials which are electrically conductive only when wet, such as dried KOH and dried NaOH, may also be used.

Alternate electrodes 80 project from one end of the sorption matrix through gasket 70 and into respective bores 82 formed through the anode end plate around the central opening of the plate. The projecting portions of electrodes 80 are uncoated and are in good electrical contact with the anode plate, thus serving as anodes. The other ends of the anodes butt against the gasket on the cathode end plate so those ends are sealed and insulated from the cathode plate.

The electrodes 84 disposed between adjacent anodes project from the opposite end of the sorption matrix through the gasket 70 and into respective bores 86 formed through the cathode plate around the central opening of the plate. The projecting portions of electrodes 84 are uncoated and are in good electrical contact with the cathode plate, thus serving as cathodes. The other ends of the cathodes butt against the sealing gasket at the anode plate so those ends of the cathodes are sealed and insulated from the anode plate. An annular anode collection manifold 88 is sealed over the anode openings in the anode plate, and an annular cathode collection manifold 90 is sealed over the cathode openings in the cathode plate, so that the electrolytic decomposition products can be collected separately and independently of each other in the manifolds, and be isolated from the fluid passing through the dehydrator.

The operation of the apparatus of FIGS. 2 and 3 is as follows:

The fluid or mixture of sample and carrier gas flows through the center of the sorption matrix by passing in and out the central openings of the end plate, and through the annular space between the sorption matrix and the housing by flowing in and out the side openings in the end plates. In this way, both sides of the sorption matrix are utilized. As shown by arrows of FIG. 2, fluid flows in the central opening of the anode plate and out the central opening of the cathode plate, and fluid flows in the side opening of the cathode plate and out the side opening of the anode plate. As fluid flows through the apparatus in contact with the sorption matrix, moisture which may be in the mixture of sample and carrier is sorbed so the matrix becomes electrically conductive. The sorbed water is subjected to the electric field established in the sorption matrix between adjacent electrodes, and electrolytic decomposition takes place, so hydrogen ions diffuse to the cathodes and oxygen ions diffuse to the anodes. The ions are neutralized at their respective electrodes, diffuse into the central pasageway of each electrode and then pass to the respective collection manifold where they are collected or discharged to atmosphere. The current automatically stops when all the sorbed water is decomposed because the sorption matrix becomes non-conducting.

As shown in FIG. 1, the dry hydrogen from the electrolytic dehydrator and detector may be collected in lines 92, 94, respectively, and stored in a hydrogen supply tank 96, which is connected through a line 98 and valve 99 to supply dry hydrogen as required to line 19 at the inlet of the converter.

In using this invention, the oxygen sample pretreater is the starting point to convert the oxygen in the sample from a physically or chemically bound state to free oxygen which is reacted with hydrogen to form water. Depending on the nature of the material under investigation or treatment, the sample pretreater can take many different forms. For example, if a liquid, such as boiler feed water is to be analyzed for dissolved oxygen, the pretreater includes an ejector scrubber in which a suitable gas, say hydrogen, is used to scrub oxygen out of the liquid. Alternatively, the pretreater includes a vaporizer which vaporizes the liquid sample, freeing oxygen. In either case, the released oxygen flows through the electrolytic dehydrator, where it is dried. The released and dried oxygen then flows into the converter where the oxygen is reacted with hydrogen to form water. If necessary, hydrogen is added to the oxygen prior to its entry into the converter to provide a large excess of hydrogen, preferably ten times the stoichiometric requirement, to insure complete reaction of the oxygen. The converter may include means other than the simple heated coil 23 for catalyzing the reaction of the oxygen, e.g., heated platinum in the form of a filament, sponge, gauze, etc.; an electrical discharge between two chemically inert electrodes; or a cold catalyst such as palladium. The sample stream and water then flows through the electrolytic detector where the water is adsorbed and electrolytically decomposed into hydrogen and oxygen. The current required for this decomposition is measured and recorded by the meter and recorder in the electrolytic detector circuit as a measure of the amount of oxygen present in the original sample.

If the original sample contains oxygen adsorbed on or absorbed in a solid, the pretreator is a sample oven which supplies adequate heat to release the bound oxygen. In some cases, the sample is heated sufficiently to melt it, or the sample is scrubbed with a carrier gas, such as hydrogen, or is subjected to both of these steps. The released oxygen is dried, if required, reacted with hydrogen, and detected, as previously described.

For materials in which the oxygen is chemically bound, say a metal oxide, the pretreator is a reducing furnace through which a stream of dry hydrogen is passed to reduce the metal oxide and form water vapor. In this case, the electrolytic dehydrator and converter are bypassed, and the sample stream is passed directly to the inlet of the electrolytic detector.

Whenever materials are encountered which produce such quantities of water as to exceed the dew point of the carrier gas, the temperature of the system is raised by suitable heating means (not shown) to keep the water in the vapor phase until it reaches the detector.

For samples containing carbon, which might react with some of the oxygen to form carbon oxides, the $CO_2$ detector is used to complete the oxygen determination. Alternatively, the conversion of the oxygen to water is done at a sufficiently low temperature to avoid any significant formation of carbon oxides.

We claim:

1. A method for detecting oxygen in a sample in which the oxygen is bound in a first state, the method comprising releasing oxygen from the sample, subjecting the released oxygen to a dehydration step to remove water which may be associated with the released oxygen, thereafter combining the released oxygen with hydrogen to bind the oxygen in a second state different from the first state and to form water, subjecting water so formed to electrolytic decomposition and recording the electric current required to effect the said decomposition.

2. A method for detecting oxygen adsorbed on a sample, the method comprising heating the sample to release oxygen from it, subjecting the released oxygen to a dehydration step to remove water which may be associated with the released oxygen, thereafter combining the released oxygen with hydrogen to form water, and subjecting water so formed to electrolytic decomposition.

3. A method for detecting oxygen dissolved in a sample, the method comprising, maintaining the sample in a liquid state, stripping the oxygen from the liquid sample, subjecting the released oxygen to a dehydration step to remove water which may be associated with the released oxygen, thereafter combining the released oxygen with hydrogen to form water, and subjecting water so formed to electrolytic decomposition.

4. A method for detecting oxygen dissolved in a sample, the method comprising vaporizing the sample to release oxygen from it, subjecting the released oxygen to a dehydration step to remove water which may be associated with the released oxygen, thereafter combining the released oxygen with hydrogen to form water, and subjecting water so formed to electrolytic decomposition.

5. A method for detecting oxygen in a sample in which the oxygen is bound in a first state, the method comprising releasing oxygen from the sample, subjecting the released oxygen to a dehydration step to remove water which may be associated with the released oxygen, thereafter combining the released oxygen with hydrogen to form water, sorbing water so formed on a hygroscopic membrane, subjecting water so sorbed to electrolytic decomposition, and recording the electric current required to effect the said decomposition.

6. A method for detecting oxygen in a sample in which the oxygen is bound in a first state, the method comprising releasing oxygen from the sample, subjecting the released oxygen to a dehydration step to remove water which may be associated with the released oxygen, thereafter combining the released oxygen with hydrogen to form water, sorbing water so formed on one side of a hygroscopic membrane, electrolytically decomposing the water so sorbed, and removing at least one of the decomposition products from the other side of the membrane.

References Cited in the file of this patent

UNITED STATES PATENTS

| 2,070,612 | Neiderreither | Feb. 16, 1937 |
| 2,098,629 | Knowlton | Nov. 9, 1937 |
| 2,384,463 | Gunn et al. | Sept. 11, 1945 |
| 2,805,191 | Hersch | Sept. 3, 1957 |
| 2,816,067 | Keidel | Dec. 10, 1957 |
| 2,830,945 | Keidel | Apr. 15, 1958 |
| 3,001,917 | Scheirer | Sept. 26, 1961 |
| 3,003,932 | Frey et al. | Oct. 10, 1961 |
| 3,006,836 | Cole | Oct. 31, 1961 |

FOREIGN PATENTS

| 213,280 | Australia | Feb. 20, 1958 |